US006345253B1

(12) United States Patent
Viswanathan

(10) Patent No.: US 6,345,253 B1
(45) Date of Patent: Feb. 5, 2002

(54) METHOD AND APPARATUS FOR RETRIEVING AUDIO INFORMATION USING PRIMARY AND SUPPLEMENTAL INDEXES

(75) Inventor: Mahesh Viswanathan, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,627

(22) Filed: Jun. 18, 1999

Related U.S. Application Data

(63) Continuation-in-part of application No. 09/288,724, filed on Apr. 9, 1999.

(51) Int. Cl.⁷ .............................................. G10L 15/22
(52) U.S. Cl. ...................... 704/272; 704/275; 704/251; 704/500
(58) Field of Search ................................ 704/231, 236, 704/238, 250, 251, 255, 260, 200, 270, 275, 272

(56) References Cited

U.S. PATENT DOCUMENTS 5,659,662 A     8/1997  Wilcox et al.
6,185,527 B1 *  2/2001  Petkovic et al. ............ 704/231

OTHER PUBLICATIONS

Proceedings of the Speech Recognition Workshop. Neti et al., "Audio Visual Speaker Recognition for Video Broadcast News" 1999.*
ICASSP–97. 1997 IEEE International Conference on Acoustics, Speech, and Signal Processing. Roy et al., "Speaker Identification based Text to Audio Alignment of Audi Retrieval System" Apr. 1997.*

S. Dharanipragada et al., "Experimental Results in Audio Indexing," Proc. ARPA SLT Workshop, (Feb. 1996).

L. Polymenakos et al., "Transcription of Broadcast News— Some Recent Improvements to IBM's LVCSR System," Proc. ARPA SLT Workshop, (Feb. 1996).

R. Bakis, "Transcription of Broadcast News Shows with the IBM Large Vocabulary Speech Recognition System," Proc. ICASSP98, Seattle, WA (1998).

(List continued on next page.)

*Primary Examiner*—Richemond Dorvil
(74) *Attorney, Agent, or Firm*—Ryan, Mason & Lewis, LLP; Paul J. Otterstedt, Esq.

(57) ABSTRACT

An audio retrieval system and method are provided for augmenting the transcription of an audio file with one or more alternate word or phrase choices, such as next-best guesses for each word or phrase, in addition to the best word sequence identified by the transcription process. The audio retrieval system can utilize a primary index file containing the best identified words and/or phrases for each portion of the input audio stream and a supplemental index file containing alternative choices for each word or phrase in the transcript. The present invention allows words that are incorrectly transcribed during speech recognition to be identified in response to a textual query by searching the supplemental index files. During an indexing process, the list of alternative word or phrase choices provided by the speech recognition system are collected to produce a set of supplemental index files. During a retrieval process, the user-specified textual query is matched against the primary and supplemental indexes derived from the transcribed audio to identify relevant documents. An objective ranking function scales matches found in the supplemental index file(s) using a predefined scaling factor, or a value reflecting the confidence value of the corresponding alternative choice as identified by the speech recognition system.

28 Claims, 3 Drawing Sheets

OTHER PUBLICATIONS

H. Beigi et al., "A Distance Measure Between Collections of Distributions and its Application to Speaker Recognition," Proc. ICASSP98, Seattle, WA (1998).

S. Chen, "Speaker, Environment and Channel Change Detection and Clustering via the Bayesian Information Criterion," Proceedings of the Speech Recognition Workshop (1998).

S. Chen et al., "Clustering via the Bayesian Information Criterion with Applications in Speech Recognition," Proc. ICASSP98, Seattle, WA (1998).

S. Chen et al., "IBM's LVCSR System for Transcription of Broadcast News Used in the 1997 Hub4 English Evaluation," Proceedings of the Speech Recognition Workshop (1998).

S. Dharanipragada et al., "A Fast Vocabulary Independent Algorithm for Spotting Words in Speech," Proc. ICASSP98, Seattle, WA (1998).

J. Navratil et al., "An Efficient Phonotactic–Acoustic system for Language Identification," Proc. ICASSP98, Seattle, WA (1998).

G. N. Ramaswamy et al., "Compression of Acoustic Features for Speech Recognition in Network Environments," Proc. ICASSP98, Seattle, WA (1998).

S. Chen et al., "Recent Improvements to IBM's Speech Recognition System for Automatic Transcription of Broadcast News," Proceedings of the Speech Recognition Workshop (1999).

S. Dharanipragada et al., "Story Segmentation and Topic Detection in the Broadcast News Domain," Proceedings of the Speech Recognition Workshop (1999).

C. Neti et al., "Audio–Visual Speaker Recognition for Video Broadcast News," Proceedings of the Speech Recognition Workshop (1999).

* cited by examiner

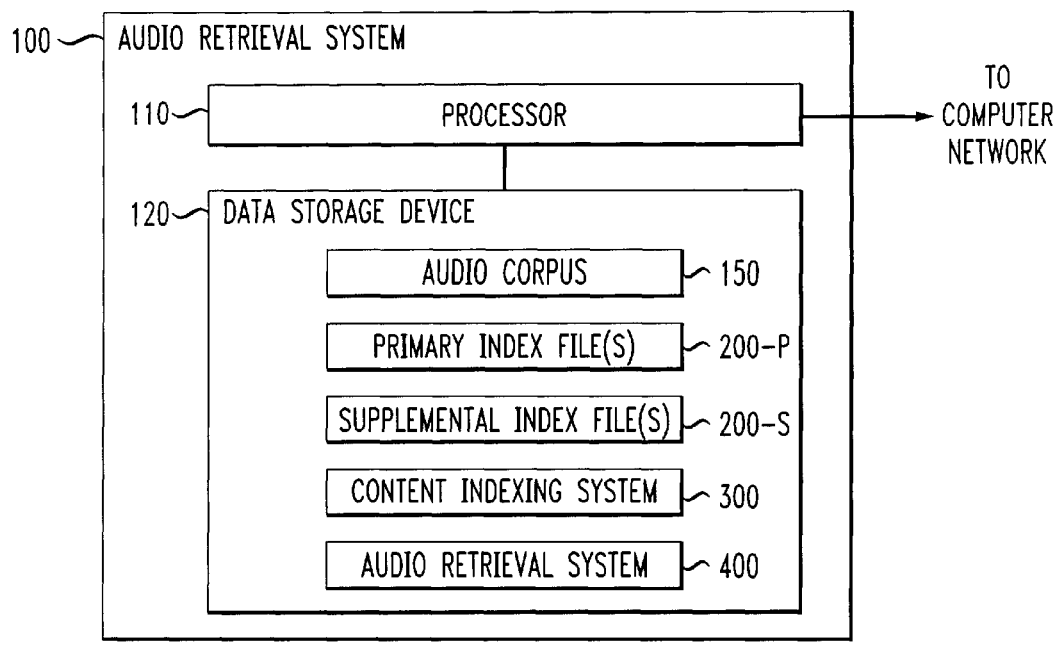

FIG. 2B

| | DOCUMENT CHUNK INDEX (DOCUMENT CHUNK N1) 240 | |
|---|---|---|
| | WORD STRING 250 | START TIME 255 |
| 241 | 1 | $t_1$ |
| 242 | 2 | $t_2$ |
| 243 | ⋮ | ⋮ |
| 244 | N | $t_N$ |

FIG. 2C

| | UNIGRAM FILE (TERM FREQUENCY) 260 | |
|---|---|---|
| | WORD STRING 265 | NUMBER OF OCCURRENCES IN DOCUMENT 270 |
| 261 | 1 | $t_1$ |
| 262 | 2 | $t_2$ |
| 263 | ⋮ | ⋮ |
| 264 | N | $t_N$ |

FIG. 2D

| | INVERSE DOCUMENT INDEX 275 | | | |
|---|---|---|---|---|
| | VOCABULARY ID 280 | WORD STRING 285 | IDF 290 | DOCUMENT LIST 295 |
| 276 | | | | |
| 277 | | | | |
| 278 | | | | |
| 279 | | | | |

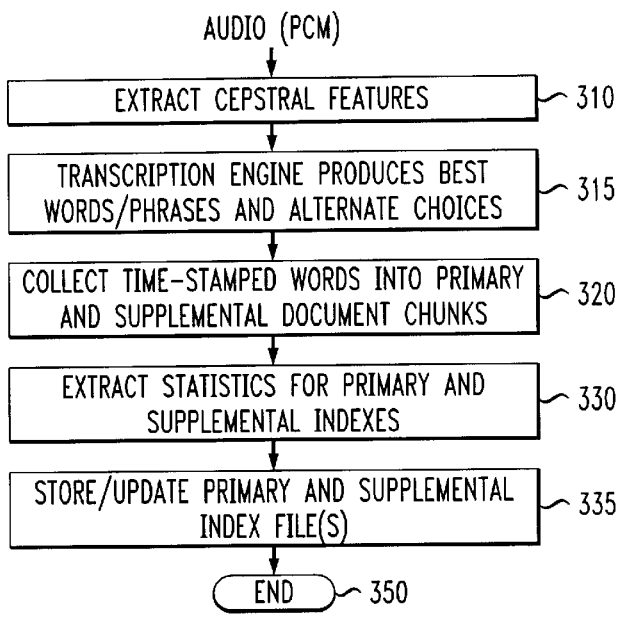
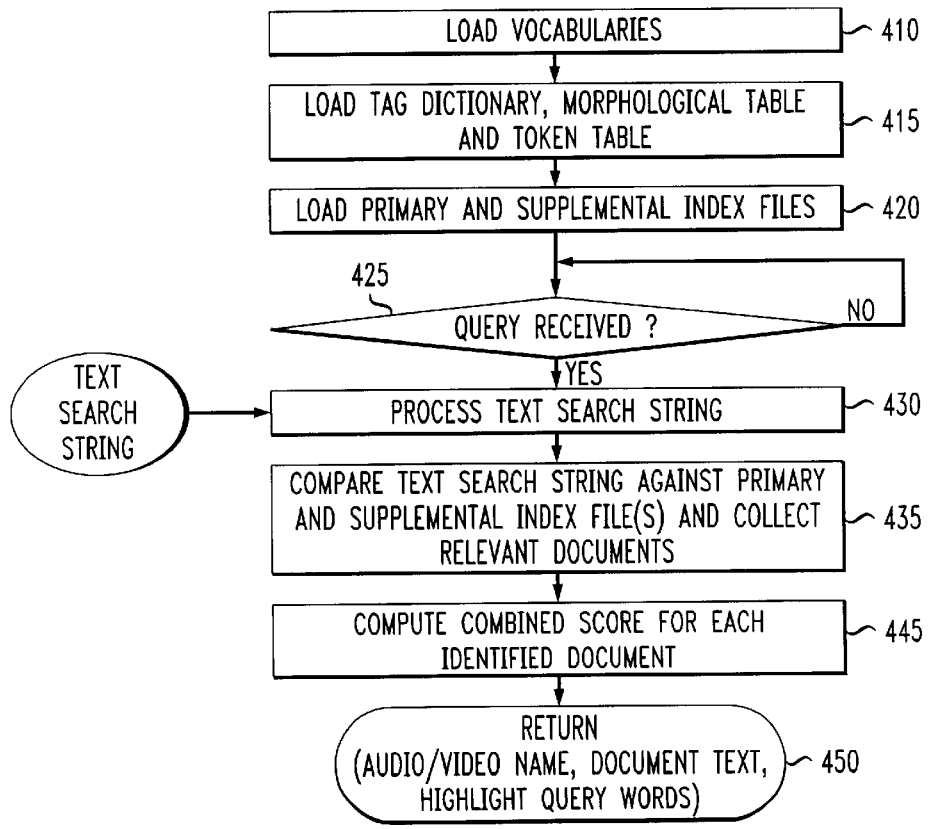

METHOD AND APPARATUS FOR RETRIEVING AUDIO INFORMATION USING PRIMARY AND SUPPLEMENTAL INDEXES

This application is a continuation-in-part of U.S. patent application Ser. No. 09/288,724, filed Apr. 9, 1999, which is assigned to the assignee of the present invention and incorporated by reference herein.

FIELD OF THE INVENTION

The present invention relates generally to information retrieval systems and, more particularly, to methods and apparatus for retrieving multimedia information, such as audio and video information, satisfying user-specified criteria from a database of multimedia files.

BACKGROUND OF THE INVENTION

Information retrieval systems have focused primarily on retrieving text documents from large collections of text. The basic principles of text retrieval are well established and have been well documented. See, for example, G. Salton, Automatic Text Processing, Addison-Wesley, 1989. An index is a mechanism that matches descriptions of documents with descriptions of queries. The indexing phase describes documents as a list of words or phrases, and the retrieval phase describes the query as a list of words or phrases. A document (or a portion thereof) is retrieved when the document description matches the description of the query.

Data retrieval models required for multimedia objects, such as audio and video files, are quite different from those required for text documents. There is little consensus on a standard set of features for indexing such multimedia information. One approach for indexing an audio database is to use certain audio cues, such as applause, music or speech. Similarly, an approach for indexing video information is to use key frames, or shot changes. For audio and video information that is predominantly speech, such as audio and video information derived from broadcast sources, the corresponding text may be generated using a speech recognition system and the transcribed text can be used for indexing the associated audio (and video).

Currently, audio information retrieval systems consist of two components, namely, a speech recognition system to transcribe the audio information into text for indexing, and a text-based information retrieval system. Speech recognition systems are typically guided by three components, namely, a vocabulary, a language model and a set of pronunciations for each word in the vocabulary. A vocabulary is a set of words that is used by the speech recognizer to translate speech to text. As part of the decoding process, the recognizer matches the acoustics from the speech input to words in the vocabulary. Therefore, the vocabulary defines the words that can be transcribed. If a word that is not in the vocabulary is to be recognized, the unrecognized word must first be added to the vocabulary.

A language model is a domain-specific database of sequences of words in the vocabulary. A set of probabilities of the words occurring in a specific order is also required. The output of the speech recognizer will be biased towards the high probability word sequences when the language model is operative. Thus, correct decoding is a function of whether the user speaks a sequence of words that has a high probability within the language model. Thus, when the user speaks an unusual sequence of words, the decoder performance will degrade. Word recognition is based entirely on its pronunciation, i.e., the phonetic representation of the word. For best accuracy, domain-specific language models must be used. The creation of such a language model requires explicit transcripts of the text along with the audio.

Text-based information retrieval systems typically work in two phases. The first phase is an off-line indexing phase, where relevant statistics about the textual documents are gathered to build an index. The second phase is an on-line searching and retrieval phase, where the index is used to perform query-document matching followed by the return of relevant documents (and additional information) to the user. During the indexing phase, the text output from the speech recognition system is processed to derive a document description that is used in the retrieval phase for rapid searching.

During the indexing process, the following operations are generally performed, in sequence: (i) tokenization, (ii) part-of-speech tagging, (iii) morphological analysis, and (iv) stop-word removal using a standard stop-word list. Tokenization detects sentence boundaries. Morphological analysis is a form of linguistic signal processing that decomposes nouns into their roots, along with a tag to indicate the plural form. Likewise, verbs are decomposed into units designating person, tense and mood, along with the root of the verb. For a general discussion of the indexing process, see, for example, S. Dharanipragada et al., "Audio-Indexing for Broadcast News," in Proc. SDR97, 1997 incorporated by reference herein.

While such content-based audio information retrieval systems allow a user to retrieve audio files containing one or more key words specified in a user-defined query, they are limited by the accuracy of the transcription process. Generally, the transcription process provides the best word sequence and rejects all others. Thus, if the transcription process improperly identifies a word or phrase in a given document, the document will be overlooked (and not returned to the user) during the query-document matching phase.

SUMMARY OF THE INVENTION

Generally, an audio retrieval system and method are disclosed for augmenting the transcription of an audio file with one or more alternate word or phrase choices, such as next-best guesses for each word or phrase, in addition to the best word sequence identified by the transcription process. The audio retrieval system can utilize a primary index file containing the best identified words and/or phrases for each portion of the input audio stream and a supplemental index file containing one or more alternative choices for each word or phrase in the transcript. The present invention allows words that are incorrectly transcribed during speech recognition to nonetheless be identified in response to a textual query by searching the supplemental index files.

During an indexing process, the list of alternative word or phrase choices provided by the speech recognition system are collected to produce a set of supplemental index files. During a retrieval process, the user-specified textual query is matched against the primary and supplemental indexes derived from the transcribed audio to identify relevant documents. An objective ranking function scales matches found in the supplemental index file(s) using a predefined scaling factor, or a value reflecting the confidence value of the corresponding alternative choice as identified by the speech recognition system.

A more complete understanding of the present invention, as well as further features and advantages of the present

BRIEF DESCRIPTION OF THE DRAWINGS

FIG. 1 is a block diagram of an audio retrieval system according to the present invention;

FIG. 2A is a table from the document database of the content index file(s) of FIG. 1;

FIG. 2B is a table from the document chunk index of the content index file(s) of FIG. 1;

FIG. 2C is a table from the unigram file (term frequency) of the content index file(s) of FIG. 1;

FIG. 2D is a table from the an inverse document index (IDF) of the content index file(s) of FIG. 1;

FIG. 3 is a flow chart describing an exemplary indexing system process, performed by the audio retrieval system of FIG. 1; and FIG. 4 is a flow chart describing an exemplary audio retrieval system process, performed by the audio retrieval system of FIG. 1.

DETAILED DESCRIPTION OF PREFERRED EMBODIMENTS

An audio retrieval system 100 according to the present invention is shown in FIG. 1. As previously indicated, audio information may be electronically retrieved by transcribing the audio information into one or more text files using a speech recognition engine and then implementing a text-based index and search scheme. Performance of audio index and retrieval systems is generally bounded by the transcription accuracy of the speech recognition engine. Generally, a speech recognition engine, such as the ViaVoice™ speech recognition system, commercially available from IBM Corporation of Armonk, N.Y., generates the textual transcript using a combination of acoustic and language model scores to determine the best word or phrase for each portion of the input audio stream. Speech recognition engines also typically generate a list of alternative choices for each word or phrase in the transcript. In addition, speech recognition engines typically rank each identified alternative word or phrase, relative to the best match, using a weighting or confidence factor.

According to a feature of the present invention, the transcription of an audio file is augmented with one or more alternate word or phrase choices, such as next-best guesses for each word or phrase, in addition to the best word sequence identified by the transcription process. In one implementation, the audio retrieval system 100 utilizes a primary index file containing the best identified words and/or phrases for each portion of the input audio stream and a supplemental index file containing alternative choices for each word or phrase in the transcript. In this manner, the present invention improves the transcribed audio, which in turn improves the performance of the audio index and retrieval system 100. The supplemental index file(s) allows query words that were originally lost due to incorrect transcription to be identified and evaluated.

Generally, audio retrieval systems attempt to obtain the most relevant segment for a given textual query. Thus, the present invention improves the overall performance of the audio index and retrieval system 100 by the improved accuracy of the speech recognition process. The present invention allows words that are incorrectly transcribed during speech recognition to nonetheless be identified in response to a textual query by searching the supplemental index files. A user query includes a text string containing one or more key words, and the present invention compares the constraints of the user-defined query to an indexed audio and/or video database and retrieves relevant audio/video segments containing the specified words.

During the indexing process, discussed further below in conjunction with FIG. 3, the list of alternative word or phrase choices provided by the speech recognition system are collected to produce a set of supplemental index files. Generally, the supplemental index files are generated in the same manner as conventional primary index files. The supplemental index files are tagged in the same manner as the primary index files to correlate each transcribed alternate word or phrase choice with its location in the original transcribed audio file.

During the retrieval process, discussed further below in conjunction with FIG. 4, the user-specified textual query is matched against the primary and supplemental indexes derived from the transcribed audio to identify relevant documents. An objective ranking function scales matches found in the supplemental index file(s) using a predefined scaling factor, or a value reflecting the confidence value of the corresponding alternative choice as identified by the speech recognition system.

As shown in FIG. 1, the audio retrieval system 100 of the present invention consists of two primary components, namely, an indexing system 300 that transcribes and indexes the audio information, and an audio retrieval system 400. As discussed further below, the indexing system 300 processes the text output from a speech recognition system during the indexing phase to perform content indexing. During the retrieval phase, the audio retrieval system 400 uses the generated primary and supplemental indexes generated during the indexing phase to perform query-document matching based on the audio content and to return relevant documents (and possibly additional information) to the user.

As discussed below, the speech recognition system produces transcripts with time-alignments for each word in the transcript. Unlike a conventional information retrieval scenario, there are no distinct documents in the transcripts and therefore one has to be artificially generated. In the illustrative embodiment, for the primary and supplemental indexes, the transcribed text corresponding to each audio or video file is automatically divided into overlapping segments of a fixed number of words, such as 100 words, and each segment is treated as a separate document. In an alternative implementation, topic identification schemes are used to segment the files into topics.

FIG. 1 is a block diagram showing the architecture of an illustrative audio retrieval system 100 in accordance with the present invention. The audio retrieval system 100 may be embodied as a general purpose computing system, such as the general purpose computing system shown in FIG. 1. The audio retrieval system 100 includes a processor 110 and related memory, such as a data storage device 120, which may be distributed or local. The processor 110 may be embodied as a single processor, or a number of local or distributed processors operating in parallel. The data storage device 120 and/or a read only memory (ROM) are operable to store one or more instructions, which the processor 110 is operable to retrieve, interpret and execute.

The data storage device 120 preferably includes an audio corpus database 150 for storing one or more audio or video files (or both) that can be indexed and retrieved in accordance with the present invention. In addition, the data storage device 120 includes one or more primary index file(s) 200-P and supplemental index file(s) 200-S, discussed below in conjunction with FIG. 2. Generally, as discussed below in conjunction with FIGS. 2A through 2D, each of the primary and supplemental index file(s) 200 include a document database 210 (FIG. 2A), a document chunk index 240 (FIG. 2B), a unigram file (term frequency) 260 (FIG. 2C) and an inverse document index (IDF) 275 (FIG. 2D).

The primary and supplemental index file(s) 200 are generated in conjunction with a speech recognition system during an indexing phase and describe the audio (or video) documents as a list of words or phrases, together with additional indexing information. Thereafter, during the retrieval phase, the primary and supplemental index file(s) 200 are accessed and a document is retrieved if the document description in the primary or supplemental index file(s) 200 matches the description of the user-specified query.

In addition, the data storage device 120 includes the program code necessary to configure the processor 110 as an indexing system 300, discussed further below in conjunction with FIG. 3, and an audio retrieval system 400, discussed further below in conjunction with FIG. 4. As previously indicated, the indexing system 300 analyzes one or more audio files in the audio corpus database 150 and produces the corresponding primary and supplemental index file(s) 200. The audio retrieval system 400 accesses the primary and supplemental index file(s) 200 in response to a user-specified query to perform query-document matching based on the audio content and to return relevant documents to the user.

Index Files

As previously indicated, the audio sample is initially transcribed, for example, using a speech recognition system, to produce a textual version of the audio information. Thereafter, the indexing system 300 analyzes the textual version of the audio file(s) to produce the corresponding primary and supplemental index file(s) 200.

As previously indicated, each of the primary and supplemental index file(s) 200 includes a document database 210 (FIG. 2A), a document chunk index 240 (FIG. 2B), a unigram file (term frequency) 260 (FIG. 2C) and an inverse document index (IDF) 275 (FIG. 2D). Generally, the primary and supplemental index files 200 store information describing the audio (or video) documents as a list of best choice or alternate words or phrases, as appropriate, together with additional indexing information. In the illustrative embodiment, the primary and supplemental index file(s) 200 record, among other things, statistics required by the Okapi equation.

The document database 210 (FIG. 2A) maintains a plurality of records, such as records 211 through 214, each associated with a different 100 word document chunk in the illustrative embodiment. In one implementation, there is a 50 word overlap between documents. For each document chunk identified in field 220, the document database 210 indicates the start and end time of the chunk in fields 222 and 224, respectively, as well as the document length in field 226. Finally, for each document chunk, the document database 210 provides a pointer to a corresponding document chunk index 240, that indexes the document chunk. Although documents have a fixed length of 100 words in the illustrative embodiment, the length in bytes can vary. As discussed below, the document length (in bytes) is used to normalize the scoring of an information retrieval.

The document chunk index 240 (FIG. 2B) maintains a plurality of records, such as records 241 through 244, each associated with a different word in the corresponding document chunk. Thus, in the illustrative implementation, there are 100 entries in each document chunk index 240. For each word string (from the document chunk) identified in field 250, the document chunk index 240 indicates the start time of the word in field 255. In addition, the document chunk index 240 may optionally indicate a confidence measure assigned by the speech recognition system, in an implementation using the confidence measure as a scaling factor.

A unigram file (term frequency) 260 (FIG. 2C) is associated with each document, and indicates the number of times each word occurs in the document. The unigram file 260 maintains a plurality of records, such as records 261 through 264, each associated with a different word appearing in the document. For each word string identified in field 265, the unigram file 260 indicates the number of times the word appears in the document in field 270.

The inverse document index 275 (FIG. 2D) indicates the number of times each word appears in the collection of documents (the audio corpus), and is used to rank the relevance of the current document amongst all documents in which the word occurs. The inverse document index 275 maintains a plurality of records, such as records 276 through 279, each associated with a different word in the vocabulary. For each word identified by the vocabulary identifier in field 280, the inverse document index 275 indicates the word string in field 285, the inverse document frequency (IDF) in field 290 and a list of the documents in which the word appears in field 295. The list of documents in field 295 permits a determination of whether the word appears in any documents without actually searching.

Indexing Process

As previously indicated, during the indexing phase, the indexing system 300, shown in FIG. 3, processes the text output from the speech recognition system to perform content indexing. As shown in FIG. 3, capstral features are initially extracted from the audio files during step 310, in a known manner. Generally, step 310 changes the domain of the audio files to the frequency domain, reduces the dynamic range and performs an inverse transform to return the signal to the time domain.

The audio information is then applied to a transcription engine, such as the ViaVoice™ speech recognition system, commercially available from IBM Corporation of Armonk, N.Y., during step 315 to produce a transcribed file of best choice time-stamped words and a transcribed file of alternate choice time-stamped words. Thereafter, the primary and supplemental time-stamped words are collected into two sets of document chunks of a fixed length, such as 100 words in the illustrative embodiment, during step 320.

The statistics required for the primary and supplemental index file(s) 200 are extracted from the audio files during step 330. As discussed above, the indexing operations includes: (i) tokenization, (ii) part-of-speech tagging, (iii) morphological analysis, and (iv) stop-word removal using a standard stop-word list. Tokenization detects sentence boundaries. Morphological analysis is a form of linguistic signal processing that decomposes nouns into their roots, along with a tag to indicate the plural form. Likewise, verbs are decomposed into units designating person, tense and mood, along with the root of the verb.

During step 330, the indexing system 300 obtains the statistics required by the Okapi equation. For each word identified in the audio field, the following information is obtained: the term frequency (number of times the word appears in a given document); the inverse document frequency (IDF) (indicating the number of documents in which the word occurs); the document length (for normalization) and a set of chain linked pointers to each document containing the word (an inverted index).

The information obtained during step 330 is stored in the primary or supplemental index file(s) 200 as appropriate during step 335, or if the primary or supplemental index file(s) 200 already exists, the information is updated.

Retrieval Process

As previously indicated, during the retrieval phase, the audio retrieval system 400, shown in FIG. 4, uses the primary and supplemental indexes generated during the indexing phase to perform query-document matching based on the audio content and to return relevant documents (and possibly additional information) to the user.

At retrieval time, the audio retrieval system 400 loads the same vocabularies, tag dictionaries, morphological tables and token tables that were used in indexing during steps 410 and 415. The appropriate primary and supplemental index file(s) 200 are loaded into memory during step 420. A test is performed during step 425 until a query is received.

The query string is received and processed during step 430. In response to a received textual query, the query string is compared during step 435 against the primary and supplemental index file(s) 200 to collect relevant document(s) satisfying the user-specified textual query. Thereafter, a combined score is computed during step 445 for each of the collected documents, using an objective ranking function (ranked document score).

The following version of the Okapi formula, for computing the ranked document score between a document d and a query q, is used:

$$S(d, q) = \sum_{k=1}^{Q} c_q(q_k) \frac{c_d(q_k)}{\alpha_1 + \alpha_2 \frac{l_d}{l} + c_d(q_k)} idf(q_k)$$

Here, $q_k$ is the $k^{th}$ term in the query, Q is the number of terms in the query, $c_q(q_k)$ and $c_d(q_k)$ are the counts of the $k^{th}$ term in the query and document respectively, $l_d$ is the length of the document, l is the average length of the documents in the collection, and $idf(q_k)$ is the inverse document frequency for the term $q_k$ which is given by:

$$idf(q_k) = \log\left(\frac{N - n(q_k) + 0.5}{n(q_k) + 0.5}\right),$$

where N is the total number of documents and $n(q_k)$ is the number of documents that contain the term $q_k$. The inverse document frequency term thus favors terms that are rare among documents. (For unigrams, $\alpha_1=0.5$ and $\alpha_2=1.5$). Clearly, the idf can be pre-calculated and stored as can most of the elements of the scoring function above except for the items relating to the query.

Each query is matched against all the documents in the primary and supplemental collections and the documents are ranked according to the computed score from the Okapi formula indicated above. The ranked document score takes into account the number of times each query term occurs in the document normalized with respect to the length of the document. This normalization removes bias that generally favor longer documents since longer documents are more likely to have more instances of any given word. This function also favors terms that are specific to a document and rare across other documents. (If a second pass is used, the documents would be re-ranked by training another model for documents, using the top-ranked documents from the first pass as training data.)

Generally, the scoring process is separately applied for each document matched in either the primary or supplemental index files 200, and is scaled once when a document is matched against the supplementary index 200. Initially, for each word in the user-specified query, referred to as a "query word," that is found in the primary index file(s) 200-P, the scoring process computes the ranked-document score using the Okapi formula set forth above, in a well-known manner.

Thereafter, for each query word that is found in the supplemental index file(s) 200-S, the scoring process initially performs a filtering step for each matching supplemental word, to ensure the words were not already found in the primary index. Specifically, the scoring process determines the location of each query word in the supplemental index file(s) 200-S and, for each query word, ensures that the word in the corresponding location of the primary index file(s) 200-P is not the same word. If the word in the corresponding location of the primary index file(s) 200-P is the same word, that word is discarded. Once this pre-scoring filtering step is complete, the ranked-document score is computed for the supplemental matching documents using the Okapi formula set forth above. The computed ranked-document score for each document is scaled using a pre-defined scaling factor, or a value reflecting the confidence value of the corresponding alternative choice as identified by the speech recognition system. The scaled ranked-document score is then added to the ranked-document score for matching documents from the principal index.

Generally, the top N documents alone are returned to the user. Thus, a list of start and end times of the N best-matched segments, together with the match-scores, and the matched words that contributed to the relevance score are returned during step 450.

It is noted that although the illustrative embodiment utilized only one alternate word/phrase for each best match word/phrase, the present invention can be extended to include more than one alternate word in the supplemental index files 200. It is further noted, however, that each lower probability alternative also increases the chance of spurious hits during retrieval.

It is to be understood that the embodiments and variations shown and described herein are merely illustrative of the principles of this invention and that various modifications may be implemented by those skilled in the art without departing from the scope and spirit of the invention.

What is claimed is:

1. A method for retrieving audio information from one or more audio sources, said method comprising the steps of:

receiving a user query specifying at least one key word; and comparing said user query with a primary index of best choices for words in said audio source and a supplemental index of at least one alternate choice for said words in said audio source to identify audio information satisfying said user query.

2. The method of claim 1, wherein said primary and supplemental indexes are time-stamped.

3. The method of claim 1, wherein said primary and supplemental indexes include the frequency of each word in said audio source.

4. The method of claim 1, wherein said primary and supplemental indexes include the inverse document frequency (IDF) of each word in said audio source.

5. The method of claim 1, wherein said primary and supplemental indexes include the length of said audio source.

6. The method of claim 1, wherein said primary and supplemental indexes include a set of chain linked pointers to each document containing a given word.

7. The method of claim 1, wherein said comparing step further comprises the step of comparing said at least one key word to words in said primary and supplemental indexes to identify relevant documents.

8. The method of claim 1, further comprising the step of transcribing and indexing said audio source to create said primary and supplemental indexes.

9. The method of claim 1, further comprising the step of returning at least a portion of said identified audio information to a user.

10. The method of claim 1, further comprising the step of assigning a score to each segment of said identified audio information and returning at least a portion of said identified audio information in a ranked-list.

11. The method of claim 10, wherein said score evaluates a ranked document score ranking the content-based information retrieval.

12. The method of claim 10, wherein said score is scaled using a predefined scaling factor for documents matching said supplemental index.

13. The method of claim 10, wherein said score is scaled using a value reflecting the confidence value of the corresponding alternative choice for documents matching said supplemental index.

14. An audio retrieval system for retrieving audio information from one or more audio sources, comprising:

a memory that stores a primary index of best choices for words in said audio source and a supplemental index of at least one alternate choice for said words in said audio source and computer-readable code; and a processor operatively coupled to said memory, said processor configured to implement said computer-readable code, said computer-readable code configured to:

receive a user query specifying one or more words; and compare said user query with said primary and supplemental indexes to identify audio information satisfying said user query.

15. The audio retrieval system of claim 14, wherein said primary and supplemental indexes are time-stamped.

16. The audio retrieval system of claim 14, wherein said primary and supplemental indexes include the frequency of each word in said audio source.

17. The audio retrieval system of claim 14, wherein said primary and supplemental indexes include the inverse document frequency (IDF) of each word in said audio source.

18. The audio retrieval system of claim 14, wherein said primary and supplemental indexes include the length of said audio source.

19. The audio retrieval system of claim 14, wherein said primary and supplemental indexes include a set of chain linked pointers to each document containing a given word.

20. The audio retrieval system of claim 14, wherein said processor is further configured to compare said at least one key word to words in said primary and supplemental indexes to identify relevant documents.

21. The audio retrieval system of claim 14, wherein said processor is further configured to transcribe and index said audio source to create said primary and supplemental indexes.

22. The audio retrieval system of claim 14, wherein said processor is further configured to transcribe and index said audio source to create said primary and supplemental indexes.

23. The audio retrieval system of claim 14, wherein said processor is further configured to return at least a portion of said identified audio information to a user.

24. The audio retrieval system of claim 14, wherein said processor is further configured to assign a score to each segment of said identified audio information and returning at least a portion of said identified audio information in a ranked-list.

25. The audio retrieval system of claim 24, wherein said score evaluates a ranked document score ranking the content-based information retrieval.

26. The audio retrieval system of claim 24, wherein said score is scaled using a predefined scaling factor for documents matching said supplemental index.

27. The audio retrieval system of claim 24, wherein said score is scaled using a value reflecting the confidence value of the corresponding alternative choice for documents matching said supplemental index.

28. An article of manufacture for retrieving audio information from one or more audio sources, comprising:

a computer readable medium having computer readable code means embodied thereon, said computer readable program code means comprising:

a step to receive a user query specifying one or more words; and a step to compare said user query with a primary index of best choices for words in said audio source and a supplemental index of at least one alternate choice for said words in said audio source to identify audio information satisfying said user query.

* * * * *